(12) United States Patent
Beck et al.

(10) Patent No.: US 9,109,671 B2
(45) Date of Patent: Aug. 18, 2015

(54) MULTI-RATIO TRANSMISSION

(71) Applicant: ZF Friedrichshafen AG, Friedrichshafen (DE)

(72) Inventors: Stefan Beck, Eriskirch (DE); Timo Wehlen, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 25 days.

(21) Appl. No.: 14/376,625

(22) PCT Filed: Jan. 10, 2013

(86) PCT No.: PCT/EP2013/050347
§ 371 (c)(1),
(2) Date: Aug. 5, 2014

(87) PCT Pub. No.: WO2013/117369
PCT Pub. Date: Aug. 15, 2013

(65) Prior Publication Data
US 2015/0011352 A1    Jan. 8, 2015

(30) Foreign Application Priority Data

Feb. 6, 2012 (DE) .......................... 10 2012 201 684

(51) Int. Cl.
*F16H 3/72* (2006.01)
*F16H 3/62* (2006.01)
(Continued)

(52) U.S. Cl.
CPC .. *F16H 3/62* (2013.01); *B60K 6/48* (2013.01); *F16H 3/666* (2013.01); *F16H 3/725* (2013.01);
(Continued)

(58) Field of Classification Search
CPC ..... F16H 3/62; F16H 3/666; F16H 2200/006; F16H 2200/2012

USPC ............ 475/286, 275, 271, 5, 276, 311, 312, 475/317, 318
See application file for complete search history.

(56) References Cited

U.S. PATENT DOCUMENTS 4,395,925 A    8/1983 Gaus
6,572,507 B1   6/2003 Korkmaz et al.
(Continued)

FOREIGN PATENT DOCUMENTS

DE    29 36 969 A1    4/1981
DE    199 12 480 A1   9/2000
(Continued)

OTHER PUBLICATIONS

German Search Report Corresponding to 10 2012 201 686.4 mailed Aug. 9, 2013 6 pages.
(Continued)

*Primary Examiner* — David J Hlavka
(74) *Attorney, Agent, or Firm* — Davis & Bujold, PLLC; Michael J. Bujold

(57) ABSTRACT

A multi-stage transmission with eight forward and one reverse gear including planetary gearsets, shafts, and shift elements. The sun gear of gearset (P1) couples shaft (3) and the ring gear of gearset (P4) and can couple the housing via brake (03). The drive shaft couples the carrier of gearset (P1) and can couple shaft (5) via clutch (15). Shaft (5) couples the ring and sun gears of respective gearsets (P2, P4). The ring gear of gearset (P1) couples shaft (6) and the sun gear of gearset (P2). Shaft (8) couples the carrier and sun gears of respective gearsets (P4, P3). Shaft (4) couples the carrier of gearset (P3) and can couple the housing via brake (04). Output shaft couples the ring gear of gearset (P4) and can couple, via clutch (27), shaft (7), which couples the carrier of gearset (P2). Clutch (67, 56, 57) engages to block gearset (P2).

17 Claims, 4 Drawing Sheets

(51) Int. Cl.
   *B60K 6/48*    (2007.10)
   *F16H 3/66*    (2006.01)

(52) U.S. Cl.
   CPC ... *B60K 2006/4825* (2013.01); *F16H 2200/006* (2013.01); *F16H 2200/2012* (2013.01); *F16H 2200/2043* (2013.01); *Y02T 10/6221* (2013.01); *Y02T 10/6252* (2013.01)

(56) References Cited

U.S. PATENT DOCUMENTS

| | | | |
|---|---|---|---|
| 7,549,942 B2 | 6/2009 | Gumpoltsberger | |
| 7,699,743 B2 | 4/2010 | Diosi et al. | |
| 8,210,981 B2 | 7/2012 | Bauknecht et al. | |
| 8,251,856 B2 * | 8/2012 | Phillips et al. | 475/280 |
| 2008/0090697 A1 | 4/2008 | Ortmann et al. | |
| 2008/0242492 A1 | 10/2008 | Phillips et al. | |
| 2008/0274853 A1* | 11/2008 | Raghavan | 475/286 |
| 2009/0305837 A1 | 12/2009 | Hiraiwa | |
| 2010/0035718 A1 | 2/2010 | Saitoh | |
| 2010/0069191 A1 | 3/2010 | Swales et al. | |
| 2010/0210399 A1 | 8/2010 | Wittkopp et al. | |
| 2012/0165153 A1* | 6/2012 | Borgerson et al. | 475/271 |
| 2012/0214631 A1* | 8/2012 | Mellet et al. | 475/5 |
| 2013/0143709 A1* | 6/2013 | Kempf et al. | 475/275 |
| 2013/0260935 A1* | 10/2013 | Mellet et al. | 475/5 |
| 2013/0267366 A1* | 10/2013 | Mellet et al. | 475/5 |

FOREIGN PATENT DOCUMENTS

| | | |
|---|---|---|
| DE | 10 2004 023 949 A1 | 12/2005 |
| DE | 10 2004 038 516 A1 | 2/2006 |
| DE | 10 2005 010 210 A1 | 9/2006 |
| DE | 10 2006 001 746 A1 | 8/2007 |
| DE | 10 2006 001 760 A1 | 8/2007 |
| DE | 10 2006 006 637 A1 | 9/2007 |
| DE | 10 2008 051 177 A1 | 8/2009 |
| DE | 10 2008 000 428 A1 | 9/2009 |
| DE | 10 2009 009 300 A1 | 9/2009 |
| DE | 10 2009 018 958 A1 | 2/2011 |
| DE | 10 2009 047 265 A1 | 6/2011 |
| JP | 2009-270667 A | 11/2009 |

OTHER PUBLICATIONS

German Search Report Corresponding to 10 2012 201 687.2 mailed Aug. 9, 2013 6 pages.
German Search Report Corresponding to 10 2012 201 690.2 mailed Aug. 12, 2013 6 pages.
German Search Report Corresponding to 10 2012 201 689.9 mailed Aug. 12, 2013 6 pages.
German Search Report Corresponding to 10 2012 201 692.9 mailed Aug. 6, 2013 6 pages.
German Search Report Corresponding to 10 2012 201 685.6 mailed Aug. 7, 2013 6 pages.
German Search Report Corresponding to 10 2012 201 684.8 mailed Aug. 22, 2013 6 pages.
German Search Report Corresponding to 10 2012 201 678.3 mailed Aug. 22, 2013 6 pages.
German Search Report Corresponding to 10 2012 201 682.1 mailed Aug. 22, 2013 6 pages.
German Search Report Corresponding to 10 2012 201 681.3 mailed Aug. 22, 2013 6 pages.
International Search Report Corresponding to PCT/EP2013/050337 mailed Mar. 22, 2013 8 pages.
International Search Report Corresponding to PCT/EP2013/050338 mailed Mar. 22, 2013 8 pages.
International Search Report Corresponding to PCT/EP2013/050340 mailed Mar. 22, 2013 8 pages.
International Search Report Corresponding to PCT/EP2013/050341 mailed Mar. 22, 2013 8 pages.
International Search Report Corresponding to PCT/EP2013/050344 mailed Mar. 22, 2013 8 pages.
International Search Report Corresponding to PCT/EP2013/050345 mailed Mar. 22, 2013 8 pages.
International Search Report Corresponding to PCT/EP2013/050347 mailed Mar. 27, 2013 6 pages.
International Search Report Corresponding to PCT/EP2013/050349 mailed Mar. 27, 2013 6 pages.
International Search Report Corresponding to PCT/EP2013/050350 mailed Mar. 27, 2013 6 pages.
International Search Report Corresponding to PCT/EP2013/050782 mailed Feb. 27, 2013 5 pages.
Written Opinion Corresponding to PCT/EP2013/050337 mailed Mar. 22, 2013 7 pages.

* cited by examiner

| GEAR | ENGAGED SHIFT ELEMENTS | | | | | TRANS. RATIO | GEAR STEP |
|---|---|---|---|---|---|---|---|
| | BRAKE | | CLUTCH | | | | |
| | 03 | 04 | 67 | 15 | 27 | i | φ |
| 1 | ● | ● | | ● | | 5.084 | |
| 2 | ● | ● | ● | | | 3.214 | 1.582 |
| 3 | | ● | ● | ● | | 1.970 | 1.631 |
| 4 | | ● | ● | | ● | 1.582 | 1.245 |
| 5 | | ● | | ● | ● | 1.257 | 1.259 |
| 6 | | | ● | ● | ● | 1.000 | 1.257 |
| 7 | ● | | | ● | ● | 0.819 | 1.221 |
| 8 | ● | | ● | | ● | 0.632 | 1.296 |
| R | ● | ● | | | ● | -3.575 | TOTAL 8.040 |

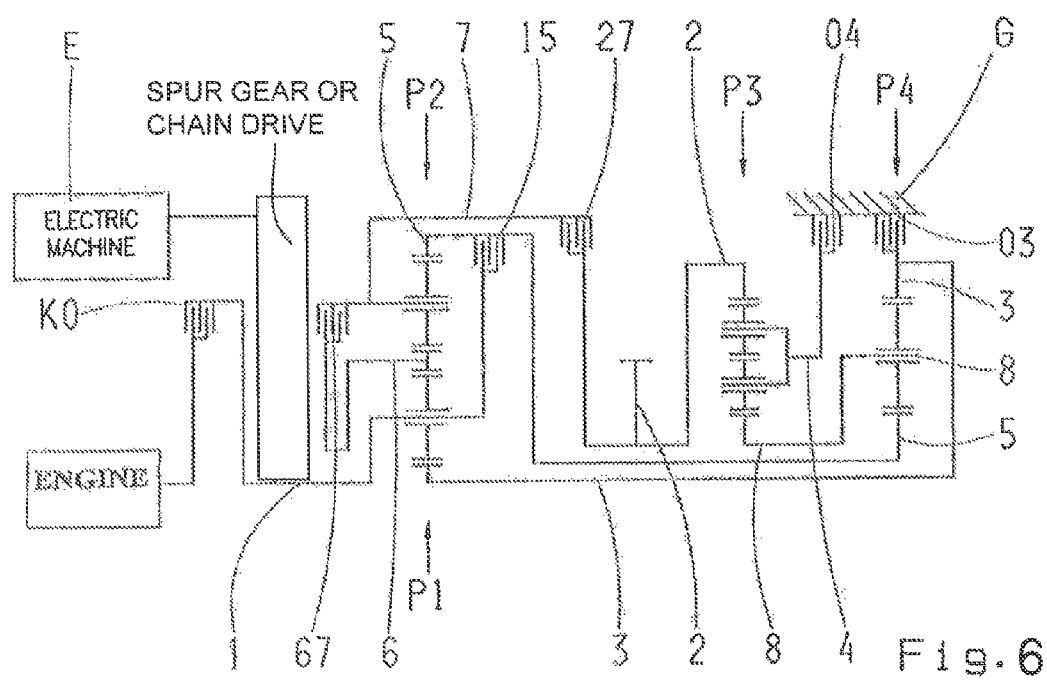

MULTI-RATIO TRANSMISSION

This application is a National Stage completion of PCT/EP2013/050347 filed Jan. 10, 2013, which claims priority from German patent application serial no. 10 2012 201 684.8 filed Feb. 6, 2012.

FIELD OF THE INVENTION

The present invention relates to a multi-stage transmission in a planetary design, particularly an automatic transmission for a motor vehicle.

BACKGROUND OF THE INVENTION

Automatic transmissions, particularly for motor vehicles, comprise planetary gear sets according to the prior art that are engaged by means of friction or shift elements such as clutches and brakes and are typically connected to a startup element, such as a hydrodynamic torque converter or a hydraulic coupling, subject to a slip effect and optionally equipped with a lock-up clutch.

Such type of automatic transmission is known, for example, from DE 199 12 480 B4 of the applicant. It comprises three carrier planetary gear sets as well as three brakes and two clutches for engaging six forward gears and one reverse gear, one drive shaft and one output shaft, in which the carrier of the first planetary gear set is permanently connected to the ring gear of the second planetary gear set and the carrier of the second planetary gear set is permanently connected to the ring gear of the third planetary gear set and the drive shaft is directly connected to the sun gear of the second planetary gear set.

Furthermore, with the known transmission, it is provided that the drive shaft can be connected to the sun gear of the first planetary gear set via the first clutch and can be connected to the carrier of the first planetary gear set via the second clutch, in which the sun gear of the first planetary gear set can be connected to a housing of the transmission via the first brake and the carrier of the first planetary gear set can be connected to the housing of the transmission via the second brake, in which the sun gear of the third planetary gear set can be connected to the housing of the transmission via the third brake. The output shaft of the transmission is permanently connected to the carrier of the third planetary gear set and the ring gear of the first planetary gear set.

Furthermore, a 9-gear multi-stage transmission is known from DE 29 36 969 A1; it comprises eight shift elements and four planetary gear sets, in which one planetary gear set serves as a front-mounted transmission and the main transmission has a Simpson set and a planetary gear set serving as a reverse gear.

Further multi-stage transmissions are known, for example, from DE 10 2005 010 210 A1 and DE 10 2006 006 637 A1 by the applicant.

Vehicle transmissions in a planetary design that can be shifted automatically have already generally been often described in the prior art and are subject to continuous further development and improvement. Thus, these transmissions should require lower construction costs and a smaller number of shift elements and, when there is sequential shifting, prevent double shifting operations, i.e. the engagement and disengagement of two shift elements, which means that only one shift element is shifted when there are shift operations in defined groups of gears.

DE 10 2008 000 428 A1 from the applicant states that a multi-stage transmission in a planetary design is known, having one drive and one output, which are arranged in a housing. With the known transmission, at least four planetary gear sets, which are designated in the following as the first, second, third, and fourth planetary gear sets; at least eight rotatable shafts, which are designated in the following as the drive shaft, output shaft, third shaft, fourth shaft, fifth shaft, sixth shaft, seventh shaft, and eighth shaft; as well as a least six shift elements, comprising brakes and clutches are provided, the selective engagement of which effects various transmission ratios between the drive and the output, which means that preferably nine forward gears and one reverse gear can be implemented.

In this case, the first and the second planetary gear set, which are preferably implemented as minus planetary gear sets, i.e. with negative stationary transmission ratios, form a splitter gear set which can be shifted and in which the third and the fourth planetary gear sets form a main gear set.

With the known multi-stage transmission, it is provided that the carriers of the first and the second planetary gear sets be coupled with one another via the fourth shaft, which is connected to an element of the main gear set, that the ring gear of the first planetary gear set be coupled to the sun gear of the second planetary gear set via the eighth shaft, which may be detachably connected to the drive shaft via a first clutch, and that the sun gear of the first planetary gear set be coupled to a housing of the transmission by means of the third shaft via a first brake and be detachably connected to the drive shaft via a second clutch, in which the ring gear of the second planetary gear set may be coupled to a housing of the transmission by means of the fifth shaft via a second brake. In addition, the seventh shaft is permanently connected to at least one element of the main gear set and may be coupled to the housing of the transmission via a third brake, in which the sixth shaft is permanently connected to at least one further element of the main gear set and is detachably connected to the drive shaft via a third clutch; the output shaft is permanently connected to at least one further element of the main gear set.

It is preferable with the known transmission if the fourth shaft is permanently connected to the ring gear of the third planetary gear set, in which the sixth shaft is permanently connected to the ring gear of the fourth planetary gear set and the carrier of the third planetary gear set and is detachably connected to the drive shaft via the third clutch. Furthermore, the seventh shaft is permanently connected to the sun gears of the third and fourth planetary gear sets and may be coupled to a housing of the transmission via the third brake. The output in this case takes place via the output shaft permanently connected to the carrier of the fourth planetary gear set. Furthermore, the third and the fourth planetary gear sets may be combined or reduced to a Ravigneaux set with a shared carrier and a shared ring gear.

SUMMARY OF THE INVENTION

The object of the present invention is to propose a multi-stage transmission of the previously mentioned type having eight forward gears and one reverse gear with sufficient transmission ratios, in which the construction cost and the overall size, particularly the overall length and the weight, are optimized and additionally the level of efficiency is improved with respect to the drag and gearing losses. In addition, reduced hogging moments should affect the shift elements with the multi-stage transmission according to the invention. Furthermore, the transmission should be particularly suitable for a front transverse design.

According to the invention, this object is achieved by the features described below.

Accordingly, a multi-stage transmission in a planetary design according to the invention is proposed, having a drive and an output, which are arranged in a housing. Furthermore, at least four planetary gear sets, which are designated in the following as the first, second, third, and fourth planetary gear set; eight rotatable shafts, which are designated in the following as the drive shaft, output shaft, third shaft, fourth shaft, fifth shaft, sixth shaft, seventh shaft, and eighth shaft; as well as a least five shift elements preferably implemented as lamellar shift elements or dog clutches, comprising two brakes and three clutches, are provided, the selective engagement of which effects various transmission ratios between the drive and the output, which means that preferably eight forward gears and one reverse gear can be implemented.

The first, second, and fourth planetary gear sets are preferably implemented as minus planetary gear sets, wherein the third planetary gear set is implemented preferably as a plus planetary gear set.

As is well known, a simple minus planetary gear set comprises a sun gear, a ring gear, and a carrier on which the planetary gears are rotatably supported, with the planetary gears meshing with the sun gear and the ring gear. As a result, when the carrier is fixed, the ring gear has a direction of rotation that is opposite that of the sun gear. In contrast, a simple plus planetary gear set comprises a sun gear, a ring gear, and a carrier, on which inner and outer planetary gears are rotatably supported, wherein all inner planetary gears mesh with the sun gear and all outer planetary gears mesh with the ring gear, and each inner planetary gear meshes with only one outer planetary gear. As a result, when the carrier is fixed, the ring gear has the same direction of rotation as the sun gear, and this results in a positive stationary transmission ratio.

According to the invention, the sun gear of the first planetary gear is connected to the third shaft, which may be coupled to the housing of the transmission via a first brake and is connected to the ring gear of the fourth planetary gear set, in which the drive shaft is connected to the carrier of the first planetary gear set and may be detachably connected to the fifth shaft via a first clutch, with the fifth shaft being connected to the ring gear of the second planetary gear set and the sun gear of the fourth planetary gear set.

Furthermore, the ring gear of the first planetary gear set is connected to the sixth shaft of the transmission, which is connected to the sun gear of the second planetary gear set, in which the eighth shaft is connected to the carrier of the fourth planetary gear set and the sun gear of the third planetary gear set, and in which the fourth shaft, which is connected to the carrier of the third planetary gear shaft, may be coupled to the housing of the transmission via a second brake.

In addition, the output shaft of the transmission is connected to the ring gear of the third planetary gear set and may be detachably connected to the seventh shaft, which is connected to the carrier of the second planetary gear set, via a second clutch, in which, according to the invention, an additional clutch is provided the engagement of which can block the second planetary gear set.

According to a first embodiment of the invention, the additional clutch is designed as a clutch that detachably connects the sixth shaft to the seventh shaft so that the blocking of the second planetary gear set can occur through a coupling of the sun gear of the second planetary gear set with the carrier of the second planetary gear set.

Within the scope of another embodiment of the invention, the additional clutch may be designed as a clutch that detachably connects the sixth shaft to the fifth shaft so that the blocking of the second planetary gear set can occur through a coupling of the ring gear of the second planetary gear set with the sun gear of the second planetary gear set.

Furthermore, the additional clutch may be designed as a clutch that detachably connects the fifth shaft to the seventh shaft so that the blocking of the second planetary gear set can occur through a coupling of the carrier of the second planetary gear set with the ring gear of the second planetary gear set.

Preferably two of the planetary gear sets are arranged above one another, when viewed radially, the result being that a very short overall length is achieved, whereby the transmission can be installed in passenger vehicles in the front transverse design.

In an advantageous manner, the second planetary gear set is disposed above the first planetary gear set, when viewed radially. Within the scope of additional embodiments of the invention, the axial sequence of the planetary gear sets can be in any form; in addition, the planetary gear sets can be arranged behind one another, when viewed axially.

The design, according to the invention, of the multi-stage transmission results in suitable transmission ratios, particularly for passenger vehicles, as well as an increased total overall spread in the multi-stage transmission, thereby resulting in an improvement in the driving comfort and a significant reduction in fuel consumption.

Furthermore, the multi-stage transmission according to the invention significantly reduces construction costs due to the lower number of shift elements. In an advantageous manner, the multi-stage transmission according to the invention makes it possible to implement startup with a hydrodynamic converter, an external startup clutch, or even with other suitable external startup elements. It is also conceivable to implement a startup process with a startup element integrated in the transmission. Preferably, a shift element that is actuated in the first forward gear and in the reverse gear is suitable.

Furthermore, the multi-stage transmission according to the invention results in a good level of efficiency in the main travel gears with respect to drag and gearing losses.

In addition, there are lower torques in the shift elements and in the planetary gear sets in the multi-stage transmission, whereby the wear is reduced in an advantageous manner with the multi-stage transmission. Furthermore, the lower torques enable a correspondingly small size, whereby the necessary packaging space and corresponding costs are reduced. In addition, there are lower rotational speeds at the shafts, the shift elements, and the planetary gear sets.

Moreover, the transmission according to the invention is designed such that adaptability to various drivetrain designs is enabled, both in the direction of force application and from a spatial perspective.

BRIEF DESCRIPTION OF THE DRAWINGS

The invention is explained in greater detail in the following by means of the attached figures and examples. In the following:

FIG. 6 shows a schematic view of a second embodiment of the hybrid variant of the embodiment of FIG. 1.

DETAILED DESCRIPTION OF THE PREFERRED EMBODIMENTS

Figure 1:
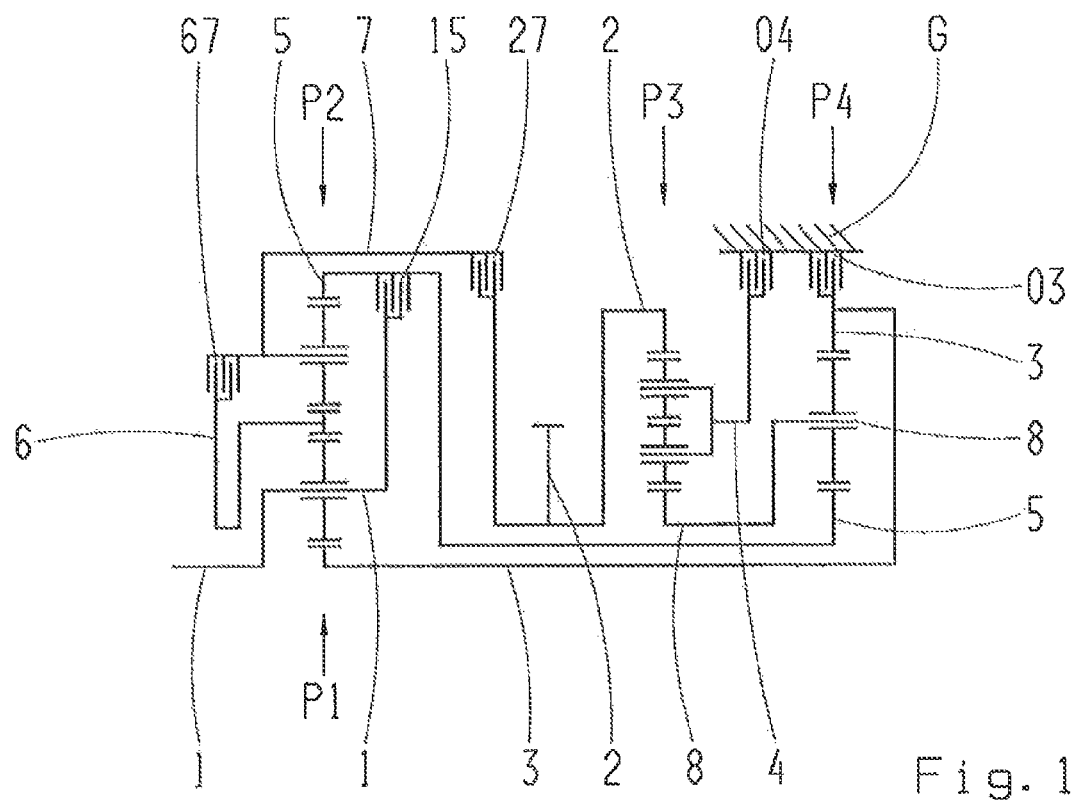
FIG. 1 shows a schematic view of a first preferred embodiment of a multi-stage transmission according to the invention.

FIG. 1 shows a multi-stage transmission according to the invention with a drive shaft 1, an output shaft 2, and four planetary gears P1, P2, P3, and P4, which are arranged in a housing G. With the example shown in FIG. 1, the first, second, and fourth planetary gear sets P1, P2, P4 are implemented as minus planetary gear sets, wherein the third planetary gear set P3 is implemented as a plus planetary gear set. According to the invention, at least one of the planetary gear sets P1, P2, P4 in the transmission can be implemented as a plus planetary gear set if the carrier and ring gear connection are exchanged and, simultaneously, the value of the stationary transmission ratio is increased by 1 in comparison to the embodiment as a minus planetary gear set.

With the exemplary embodiment shown, the second planetary gear set P2 is arranged above the first planetary gear set P1, when viewed radially; the planetary gear sets are arranged, when viewed axially, in the sequence of first planetary gear set P1/second planetary gear set P2, third planetary gear set P3, fourth planetary gear set P4. Within the scope of additional embodiments of the invention, the axial sequence of the planetary gear sets can be in any form. In addition, the planetary gear sets can be arranged behind one another, when viewed axially, preferably in the sequence of first planetary gear set P1, second planetary gear set P2, third planetary gear set P3, fourth planetary gear set P4.

As shown in FIG. 1, there are five shift elements, namely two brakes 03, 04 and three clutches 15, 27, and 67. The spatial disposition of the shift elements can be arbitrary and is limited only by the dimensions of the outer design. The clutches and the brakes of the transmission are preferably implemented as friction shift and dog clutch elements.

These shift elements make it possible to selectively shift eight forward gears and one reverse gear. The multi-stage transmission according to the invention has a total of eight rotatable shafts, namely shafts 1, 2, 3, 4, 5, 6, 7, and 8, in which the drive shaft forms the first shaft 1 and the output shaft forms the second shaft 2 of the transmission. The output occurs transversely with respect to longitudinal axis of the drive shaft 1, which makes a front transverse design possible.

According to the invention, with the multi-stage transmission according to FIG. 1, the sun gear of the first planetary gear set P1 is connected to the third shaft 3, which may be coupled to the housing G of the transmission via a first brake 03 and is connected to the ring gear of the fourth planetary gear set P4, wherein the drive shaft 1 is connected to the carrier of the first planetary gear set P1 and may be detachably connected to the fifth shaft 5 via a first clutch 15, with the fifth shaft 5 being connected to the ring gear of the second planetary gear set P2 and the sun gear of the fourth planetary gear set P4.

As FIG. 1 shows, the ring gear of the first planetary gear set P1 is connected to the sixth shaft 6, which is connected to the sun gear of the second planetary gear set P2, wherein the eighth shaft 8 is connected to the carrier of the fourth planetary gear set P4 and the sun gear of the third planetary gear set P3. The fourth shaft 4, which is connected to the carrier of the third planetary gear set 4, may be coupled to the housing G of the transmission via a second brake 04.

In addition, the output shaft 2 is connected to the ring gear of the third planetary gear set P3 and may be detachably connected to the seventh shaft 7, which is connected to the carrier of the second planetary gear set P2, via a second clutch 27, wherein, according to the invention, an additional clutch is provided the engagement of which can block the second planetary gear set P2.

With the exemplary embodiment shown in FIG. 1, the additional clutch is designed as a third clutch 67 that detachably connects the sixth shaft 6 to the seventh shaft 7 so that the blocking of the second planetary gear set P2 can occur through a coupling of the carrier with the sun gear.

According to the invention, the additional clutch may be implemented as a fourth clutch 56, which detachably connects the fifth shaft 5 to the sixth shaft 6; in this manner, there is blocking of the second planetary gear set P2 due to a coupling of the sun gear with the ring gear. This embodiment is the subject matter of FIG. 2. In this case, the first and the fourth clutches 15, 56 may preferably be arranged next to one another, when viewed axially, and may have a shared outer disk carrier.

Figures 3, 4:
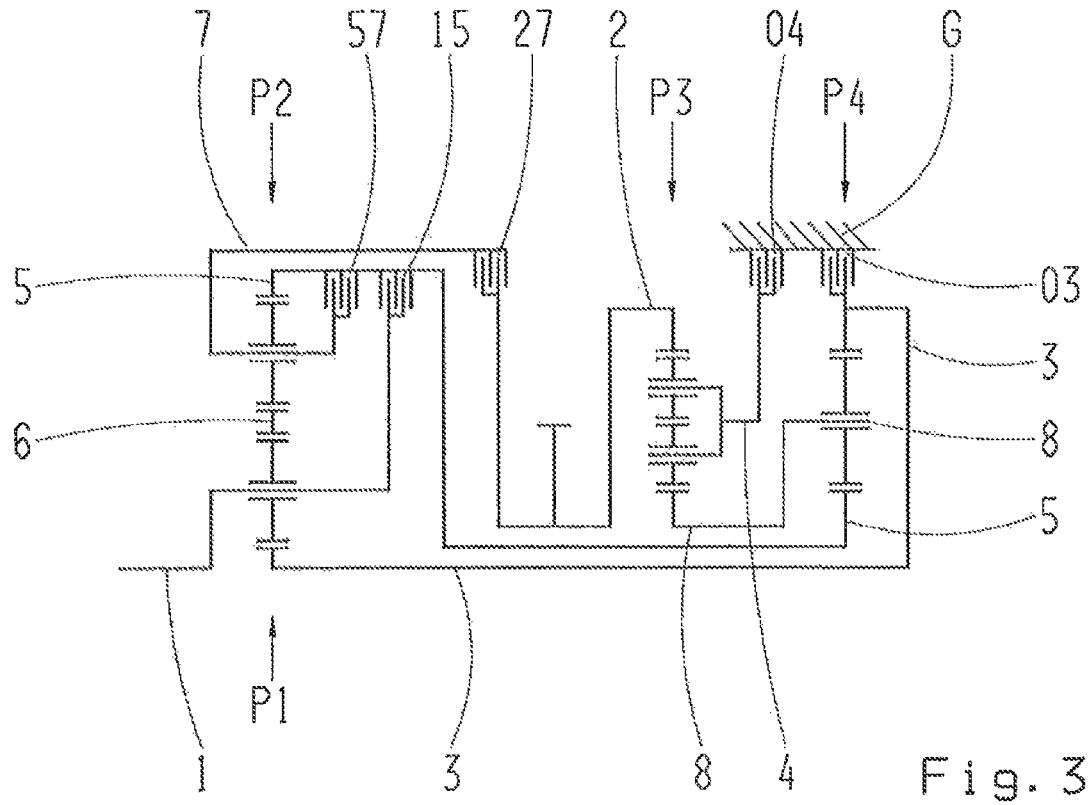
FIG. 3 shows a schematic view of a third preferred embodiment of a multi-stage transmission according to the invention.
FIG. 4 shows an example gearshift pattern for a multi-stage transmission according to FIGS. 1, 2, and 3.

Furthermore, with reference to the exemplary embodiment according to FIG. 3, the additional clutch may be implemented as the fifth clutch 57, which detachably connects the fifth shaft 5 to the seventh shaft 7, whereby the blocking of the second planetary gear set P2 occurs through a coupling of the carrier with the ring gear. In this case, the first and the fifth clutches 15, 57 may preferably be arranged next to one another, when viewed axially, and may have a shared outer disk carrier.

Figure 2:
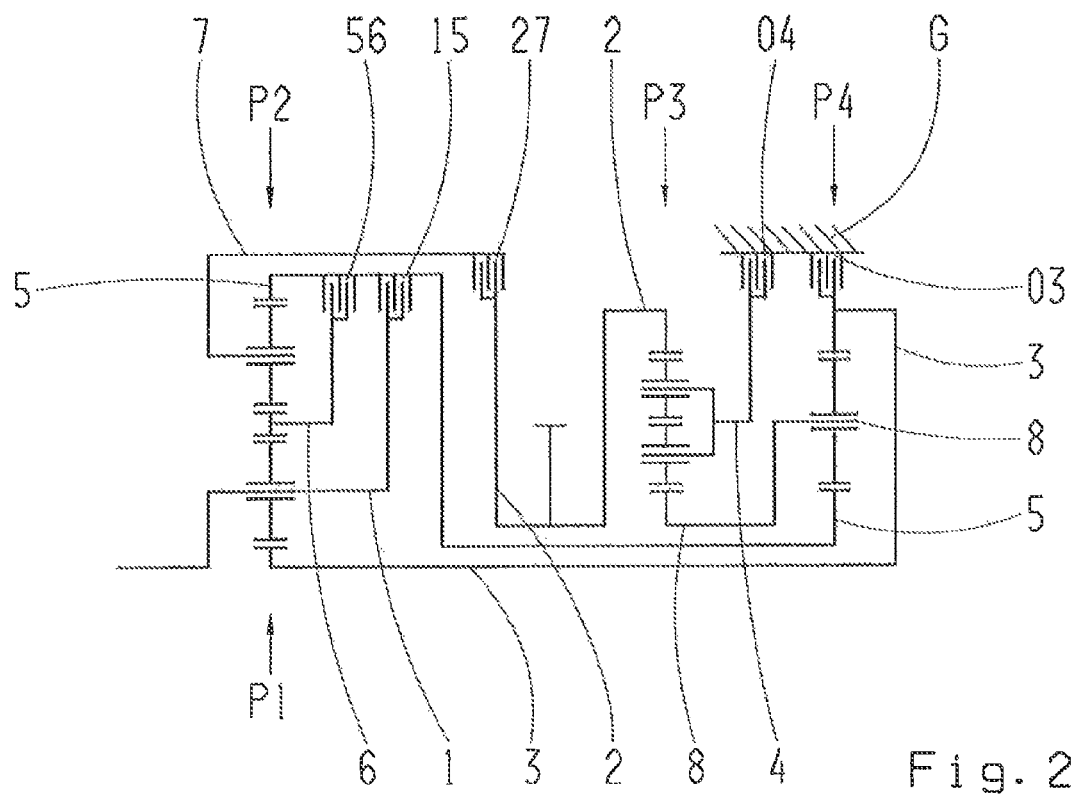
FIG. 2 shows a schematic view of a second preferred embodiment of a multi-stage transmission according to the invention.

With reference to FIGS. 1, 2, 3, the output occurs transversely with respect to the longitudinal axis of the drive shaft 1; the output shaft 2 is arranged, when viewed axially, between the third planetary gear set P3 and the first and second planetary gear sets P1, P2, which when viewed radially are arranged above one another.

FIG. 4 shows an exemplary gearshift pattern of a multi-stage transmission according to FIGS. 1, 2, and 3. Three shifting elements are engaged for each gear. The respective transmission ratios φ of the individual gears and the resulting gear steps or progressive ratios φ to be determined for the next-higher gear can be seen, by way of example, in the gearshift pattern, in which the value 8.040 represents the spread of the transmission.

The values for the stationary transmission ratios of planetary gear sets P1, P2, P4, which are implemented as minus planetary gear sets, are −1.720, −1.630, and −1.580, respectively, with the example shown, in which the stationary transmission ratio of the third planetary gear set P3, which is implemented as a plus planetary gear set, is 1.970. FIG. 4 shows that only one shift element must be engaged and one shift element disengaged with the sequential shifting method, because two adjacent gears utilize two shifting elements jointly. Furthermore, it is clear that a large spread is achieved with small gear steps.

The first forward gear results from engaging the first and second brake 03, 04 and the first clutch 15; the second forward gear results from engaging the first and second brake 03, 04 and the third clutch 67; the third forward gear results from engaging the second brake 04 and the first and third clutch 15, 67; the fourth forward gear results from engaging the second brake 04 and the second and third clutch 27, 67; the fifth forward gear results from engaging the second brake 04 and the first and second clutch 15, 27; the sixth forward gear results from engaging the first, second, and third clutch 15, 27, 67; the seventh forward gear results from engaging the first brake 03 and the first and second clutch 15, 27; and the eighth forward gear results from engaging the first brake 03 and the second and third clutch 27, 67; while the reverse gear results from engaging the first and second brake 03, 04 and the second clutch 27.

For the embodiment shown in FIG. 2, the gearshift pattern differs from the gearshift pattern according to FIG. 4 only in that the third clutch 67 is replaced by the fourth clutch 56, wherein, in the event of a transmission according to FIG. 3, the third clutch 67 is replaced by the fifth clutch 57.

By virtue of the fact that the first and second brake 03, 04 are engaged in the first forward gear and in reverse gear, these shift elements may be used as startup elements.

According to the invention, this results in different gear steps with the same gearshift pattern, depending on the shift logic, which means that an application- or vehicle-specific variation is enabled.

Figure 5:
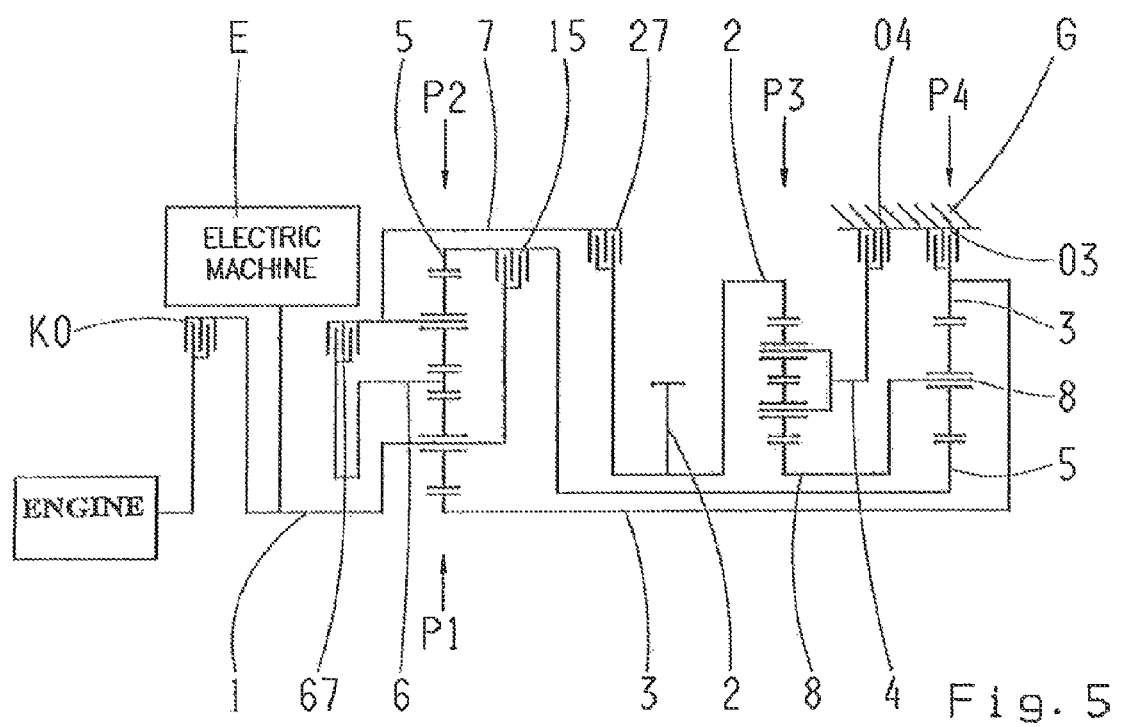
FIG. 5 shows a schematic view of a hybrid variant of the embodiment according to FIG. 1.

The exemplary embodiment shown in FIG. 5 corresponds to the exemplary embodiment according to FIG. 1 with the difference that an electric machine E is provided, which is directly connected to the drive shaft 1 of the transmission. As an alternative to the direct connection of the electric machine E to the drive shaft 1, the electric machine E may be arranged parallel to the axis with respect to the drive shaft 1 and, as diagrammatically shown in FIG. 6, be connected to the drive shaft 1 via a spur gear or a chain drive. With the example shown in FIG. 5, a sixth clutch K0 is provided by means of which the combustion engine can be decoupled from the transmission, whereby all gears of the transmission can be operated purely electrically Similar to the example according to FIG. 5, the other embodiments according to the invention in FIGS. 2 and 3 may also be hybridized.

According to the invention, in another option, it is possible to provide additional freewheels on any suitable site of the multi-stage transmission, for example between a shaft and the housing or optionally to connect two shafts.

An axle differential and/or a distributor differential may be disposed on the drive side or on the output side.

Within the scope of an advantageous further embodiment of the invention, the drive shaft 1 may be separated from a drive motor by a clutch element as needed, in which a hydrodynamic converter, a hydraulic clutch, a dry startup clutch, a wet startup clutch, a magnetic particle clutch, or a centrifugal clutch may be used as the clutch element. It is also possible to arrange such type of startup element in the direction of force application, behind the transmission, in which, in this case, the drive shaft 1 is permanently connected to the crankshaft of the drive motor.

The multi-stage transmission according to the invention additionally enables the placement of a torsion vibration damper between the drive motor and the transmission.

Within the scope of an additional embodiment of the invention, which is not shown, a non-wearing brake may be placed on any shaft, preferably on drive shaft or drive shaft 2, such as, for example, a hydraulic or electric retarder or the like, which is of particular importance especially for use in commercial vehicles. Furthermore, an auxiliary drive may be provided on any shaft, preferably on drive shaft 1 or drive shaft 2, in order to drive additional units.

The friction shift elements used may be implemented as power shift clutches or brakes. In particular, friction clutches or brakes, such as, for example, disc clutches, band brakes, and/or cone clutches, may be used.

An additional advantage of the multi-stage transmission shown here is that an electric machine may be attached on any shaft as a generator and/or as an additional drive motor.

REFERENCE CHARACTERS

1 first shaft, drive shaft
2 second shaft, output shaft
3 third shaft
4 fourth shaft
5 fifth shaft
6 sixth shaft
7 seventh shaft
8 eighth shaft
03 first brake
04 second brake
15 first clutch
27 second clutch
56 fourth clutch
57 fifth clutch
67 third clutch
E electric machine
G housing
K0 sixth clutch
P1 first planetary gear set
P2 second planetary gear set
P3 third planetary gear set
P4 fourth planetary gear set
i transmission ratio
φ progressive ratio

The invention claimed is:

1. A mufti-stage automatic transmission for a motor vehicle, the transmission comprising:
    a drive shaft (1) and an output shaft (2);
    first, second, third and fourth planetary gear sets (P1, P2, P3, P4) being arranged in a housing (G), and each of the first, the second, the third and the fourth planetary gear sets comprising a sun gear, a ring gear and a carrier;
    at least third, fourth, fifth, sixth, seventh and eighth rotatable shafts (3, 4, 5, 6, 7, 8);
    at least five shift elements (03, 04, 15, 27, 56, 57, 67) comprising first and second brakes (03, 04) and first, second and third clutches (15, 27, 56, 57, 67) whose selective engagement results in different transmission ratios between the drive shaft (1) and the output shaft (2) so that eight forward gears and one reverse gear are implementable;
    the sun gear of the first planetary gear set (P1) is connected to the third shaft (3), and the third shaft (3) being couplable to the housing (G) via the first brake (03) and being connected to the ring gear of the fourth planetary gear set (P4);
    the drive shaft (1) being directly connected to the carrier of the first planetary gear set (P1) and also being detachably connectable to the fifth shaft (5) via the first clutch (15), and the fifth shaft (5) only directly interconnecting the ring gear of the second planetary gear set (P2) with the sun gear of the fourth planetary gear set (P4);
    the ring gear of the first planetary gear set (P1) being connected to the sixth shaft (6), and the sixth shaft (6) also being connected to the sun gear of the second planetary gear set (P2);
    the eighth shaft (8) being connected to the carrier of the fourth planetary gear set (P4) and the sun gear of the third planetary gear set (P3),
    the fourth shaft (4) being connected to the carrier of the third planetary gear set (P3) and the fourth shaft (4) being connectable to the housing (G) via the second brake (04);
    the output shaft (2) being directly connected to the ring gear of the third planetary gear set (P3);
    the seventh shaft (7) being directly connected to the carrier of the second planetary gear set (P2), and the output shaft (2) also being directly connected to the second clutch (27) for detachably connecting the seventh shaft (7) to the output shaft (2); and the third clutch (67, 56, 57), when engaged, facilitating blocking of the second planetary gear set (P2).

2. The multi-stage transmission according to claim 1, wherein the third clutch (67) detachably connects the sixth shaft (6) to the seventh shaft (7) so that, when the third clutch (67) is engaged, the second planetary gear set (P2) is blocked due to coupling of the carrier of the second planetary gear set (P2) with the sun gear of the second planetary gear set (P2).

3. The multi-stage transmission according to claim 1, wherein the third clutch (56) detachably connects the fifth shaft (5) to the sixth shaft (6) so that, when the third clutch (56) is engaged, the second planetary gear set (P2) is blocked due to coupling of the sun gear of the second planetary gear set (P2) with the ring gear of the second planetary gear set (P2).

4. The multi-stage transmission according to claim 1, wherein the third clutch (57) detachably connects the fifth shaft (5) to the seventh shaft (7) so that, when the fifth clutch (57) is engaged, the second planetary gear set (P2) is blocked due to coupling of the carrier of the second planetary gear set (P2) with the ring gear of the second planetary gear set (P2).

5. The multi-stage transmission according to claim 1, wherein the first, the second, and the fourth planetary gear sets (P1, P2, P4) are minus planetary gear sets and the third planetary gear set (P3) is a plus planetary gear set.

6. The multi-stage transmission according to claim 1, wherein, when viewed radially, the second planetary gear set (P2) is arranged about the first planetary gear set (P1).

7. The multi-stage transmission according to claim 6, wherein the first, the second, the third and the fourth planetary gear sets, when viewed axially, are arranged in a sequence of both the first planetary gear set (P1) and second planetary gear set (P2), followed by the third planetary gear set (P3) and then the fourth planetary gear set (P4).

8. The multi-stage transmission according to claim 1, wherein an electric machine (E) is connected to the drive shaft (1) of the transmission either directly or via either a spur gear or a chain drive.

9. The multistage transmission according to claim 8, wherein an internal combustion engine is decouplable from the transmission by a fourth clutch (K0), whereby all gears of the transmission can be operated purely electrically.

10. The multi-stage transmission according to claim 1, wherein the third clutch (67) detachably connects the sixth shaft (6) to the seventh shaft (7), and a first forward gear is implemented by engagement of the first and the second brakes (03, 04) and the first clutch (15);

a second forward gear is implemented by engagement of the first and the second brakes (03, 04) and the third clutch (67);

a third forward gear is implemented by engagement of the second brake (04) and the first and the third clutches (15, 67);

a fourth forward gear is implemented by engagement of the second brake (04) and the second and the third clutches (27, 67);

a fifth forward gear is implemented by engagement of the second brake (04) and the first and the second clutches (15, 27);

a sixth forward gear is implemented by engagement of the first, the second, and the third clutches (15, 27, 67);

a seventh forward gear is implemented by engagement of the first brake (03) and the first and the second clutches (15, 27);

an eighth forward gear is implemented by engagement of the first brake (03) and the second and the third clutches (27, 67); and the reverse gear is implemented by engagement of the first and the second brakes (03, 04) and the second clutch (27).

11. The multi-stage transmission according to claim 1, wherein the third clutch (56) detachably connects the sixth shaft (6) to the fifth shaft (5), and a first forward gear is implemented by engagement of the first and the second brakes (03, 04) and the first clutch (15);

a second forward gear is implemented by engagement of the first and the second brakes (03, 04) and the third clutch (67);

a third forward gear is implemented by engagement of the second brake (04) and the first and the third clutches (15, 67);

a fourth forward gear is implemented by engagement of the second brake (04) and the second and the third clutches (27, 67);

a fifth forward gear is implemented by engagement of the second brake (04) and the first and the second clutches (15, 27);

a sixth forward gear is implemented by engagement of the first, the second, and the third clutches (15, 27, 67);

a seventh forward gear is implemented by engagement of the first brake (03) and the first and the second clutches (15, 27);

an eighth forward gear is implemented by engagement of the first brake (03) and the second and the third clutches (27, 67); and the reverse gear is implemented by engagement of the first and the second brakes (03, 04) and the second clutch (27).

12. The multi-stage transmission according to claim 11, wherein, the third clutch (57) detachably connects the fifth shaft (5) to the seventh shaft (7), and a first forward gear is implemented by engagement of the first and the second brakes (03, 04) and the first clutch (15);

a second forward gear is implemented by engagement of the first and the second brakes (03, 04) and the third clutch (67);

a third forward gear is implemented by engagement of the second brake (04) and the first and the third clutches (15, 67);

a fourth forward gear is implemented by engagement of the second brake (04) and the second and the third clutches (27, 67);

a fifth forward gear is implemented by engagement of the second brake (04) and the first and the second clutches (15, 27);

a sixth forward gear is implemented by engagement of the first, the second, and the third clutches (15, 27, 67);

a seventh forward gear is implemented by engagement of the first brake (03) and the first and the second clutches (15, 27);

an eighth forward gear is implemented by engagement of the first brake (03) and the second and the third clutches (27, 67); and the reverse gear is implemented by engagement of the first and the second brakes (03, 04) and the second clutch (27).

13. A mufti-stage automatic transmission for a motor vehicle, the transmission comprising:

a drive shaft (1) and an output shaft (2);

first, second, and third and fourth planetary gear sets (P1, P2, P3, P4) being arranged in a housing (G), and each of the first, the second, the third and the fourth planetary gear sets comprising a sun gear, a ring gear and a carrier;

at least third, fourth, fifth, sixth, seventh and eighth rotatable shafts (3, 4, 5, 6, 7, 8);

only five shift elements (03, 04, 15, 27, 56, 57, 67) comprising first and second brakes (03, 04) and first, second and third clutches (15, 27, 56, 57, 67) whose selective engagement results in different transmission ratios between the drive shaft (1) and the output shaft (2) so that eight forward gears and one reverse gear are implementable;

the sun gear of the first planetary gear set (P1) is connected to the third shaft (3), and the third shaft (3) being couplable to the housing (G) via the first brake (03) and being connected to the ring gear of the fourth planetary gear set (P4);

the drive shaft (1) being directly connected to the carrier of the first planetary gear set (P1) and being detachably connectable to the fifth shaft (5) via the first clutch (15), and the fifth shaft (5) being connected to the ring gear of the second planetary gear set (P2) and the fifth shaft (5) being connected to the sun gear of the fourth planetary gear set (P4);

the ring gear of the first planetary gear set (P1) being connected to the sixth shaft (6), and the sixth shaft (6) also being connected to the sun gear of the second planetary gear set (P2);

the eighth shaft (8) being connected to the carrier of the fourth planetary gear set (P4) and the sun gear of the third planetary gear set (P3), the fourth shaft (4) being connected to the carrier of the third planetary gear set (P3) and the fourth shaft (4) being connectable to the housing (G) via the second brake (04);

the output shaft (2) being directly connected to the ring gear of the third planetary gear set (P3);

the seventh shaft (7) being directly connected to the carrier of the second planetary gear set (P2), and the output shaft (2) also being directly connected to the second clutch (27) for detachably connecting the seventh shaft (7) to the output shaft (2); and the third clutch (67, 56, 57), when engaged, facilitating blocking of the second planetary gear set (P2).

14. The multi-stage transmission according to claim 13, wherein the five shift elements (03, 04, 15, 27, 56, 57, 67) only comprises the first and the second brakes (03, 04).

15. The multi-stage transmission according to claim 13, wherein the third clutch (67) detachably connects the sixth shaft (6) to the seventh shaft (7), and
a first forward gear is implemented by engagement of the first and the second brakes (03, 04) and the first clutch (15);
a second forward gear is implemented by engagement of the first and the second brakes (03, 04) and the third clutch (67);
a third forward gear is implemented by engagement of the second brake (04) and the first and the third clutches (15, 67);
a fourth forward gear is implemented by engagement of the second brake (04) and the second and the third clutches (27, 67);
a fifth forward gear is implemented by engagement of the second brake (04) and the first and the second clutches (15, 27);
a sixth forward gear is implemented by engagement of the first, the second, and the third clutches (15, 27, 67);
a seventh forward gear is implemented by engagement of the first brake (03) and the first and the second clutches (15, 27);
an eighth forward gear is implemented by engagement of the first brake (03) and the second and the third clutches (27, 67); and
the reverse gear is implemented by engagement of the first and the second brakes (03, 04) and the second clutch (27).

16. The multi-stage transmission according to claim 13, wherein the third clutch (56) detachably connects the sixth shaft (6) to the fifth shaft (5), and a first forward gear is implemented by engagement of the first and the second brakes (03, 04) and the first clutch (15);
a second forward gear is implemented by engagement of the first and the second brakes (03, 04) and the third clutch (67);
a third forward gear is implemented by engagement of the second brake (04) and the first and the third clutches (15, 67);
a fourth forward gear is implemented by engagement of the second brake (04) and the second and the third clutches (27, 67);
a fifth forward gear is implemented by engagement of the second brake (04) and the first and the second clutches (15, 27);
a sixth forward gear is implemented by engagement of the first, the second, and the third clutches (15, 27, 67);
a seventh forward gear is implemented by engagement of the first brake (03) and the first and the second clutches (15, 27);
an eighth forward gear is implemented by engagement of the first brake (03) and the second and the third clutches (27, 67); and
the reverse gear is implemented by engagement of the first and the second brakes (03, 04) and the second clutch (27).

17. The multi-stage transmission according to claim 13, wherein, the third clutch (57) detachably connects the fifth shaft (5) to the seventh shaft (7), and a first forward gear is implemented by engagement of the first and the second brakes (03, 04) and the first clutch (15);
a second forward gear is implemented by engagement of the first and the second brakes (03, 04) and the third clutch (67);
a third forward gear is implemented by engagement of the second brake (04) and the first and the third clutches (15, 67);
a fourth forward gear is implemented by engagement of the second brake (04) and the second and the third clutches (27, 67);
a fifth forward gear is implemented by engagement of the second brake (04) and the first and the second clutches (15, 27);
a sixth forward gear is implemented by engagement of the first, the second, and the third clutches (15, 27, 67);
a seventh forward gear is implemented by engagement of the first brake (03) and the first and the second clutches (15, 27);
an eighth forward gear is implemented by engagement of the first brake (03) and the second and the third clutches (27, 67); and
the reverse gear is implemented by engagement of the first and the second brakes (03, 04) and the second clutch (27).

* * * * *